(12) United States Patent
Prabhu et al.

(10) Patent No.: US 6,374,602 B1
(45) Date of Patent: Apr. 23, 2002

(54) CONTROL SYSTEM FOR A HYDRAULIC TRANSFORMER HAVING VARIABLE PRESSURE INPUT

(75) Inventors: Sameer M. Prabhu, Clayton; Satyendra Singh, Cary, both of NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/270,333

(22) Filed: Mar. 16, 1999

(51) Int. Cl.⁷ ............................................. F16D 31/02
(52) U.S. Cl. ...................................................... 60/419
(58) Field of Search ........................... 60/419; 417/225, 417/348

(56) References Cited

U.S. PATENT DOCUMENTS

| | | | | |
|---|---|---|---|---|
| 5,293,745 A | * | 3/1994 | Roche | 60/419 |
| 5,878,569 A | * | 3/1999 | Satzler | 60/419 |

FOREIGN PATENT DOCUMENTS

| | | | |
|---|---|---|---|
| DE | 32 33 046 A1 | 3/1984 | |
| DE | 198 42 534 A1 | 2/2000 | |
| WO | 97/31185 | 8/1997 | |
| WO | WO 98/54450 | 12/1998 | |
| WO | WO 98/54468 | 12/1998 | ................. 60/419 |

OTHER PUBLICATIONS

Achten, et al., Transforming Future Hydraulics: A New Design Of A Hydraulic Transformer.

* cited by examiner

Primary Examiner—F. Daniel Lopez
(74) Attorney, Agent, or Firm—Taylor & Aust, P.C.

(57) ABSTRACT

A control system for a hydraulic transformer providing hydraulic pressure to a fluid actuator has a hydraulic system for providing a variable pressure input to the hydraulic transformer, and a controller connected to the hydraulic transformer and the hydraulic system for matching the flow demand from the hydraulic transformer to the flow produced by the hydraulic system.

17 Claims, 2 Drawing Sheets

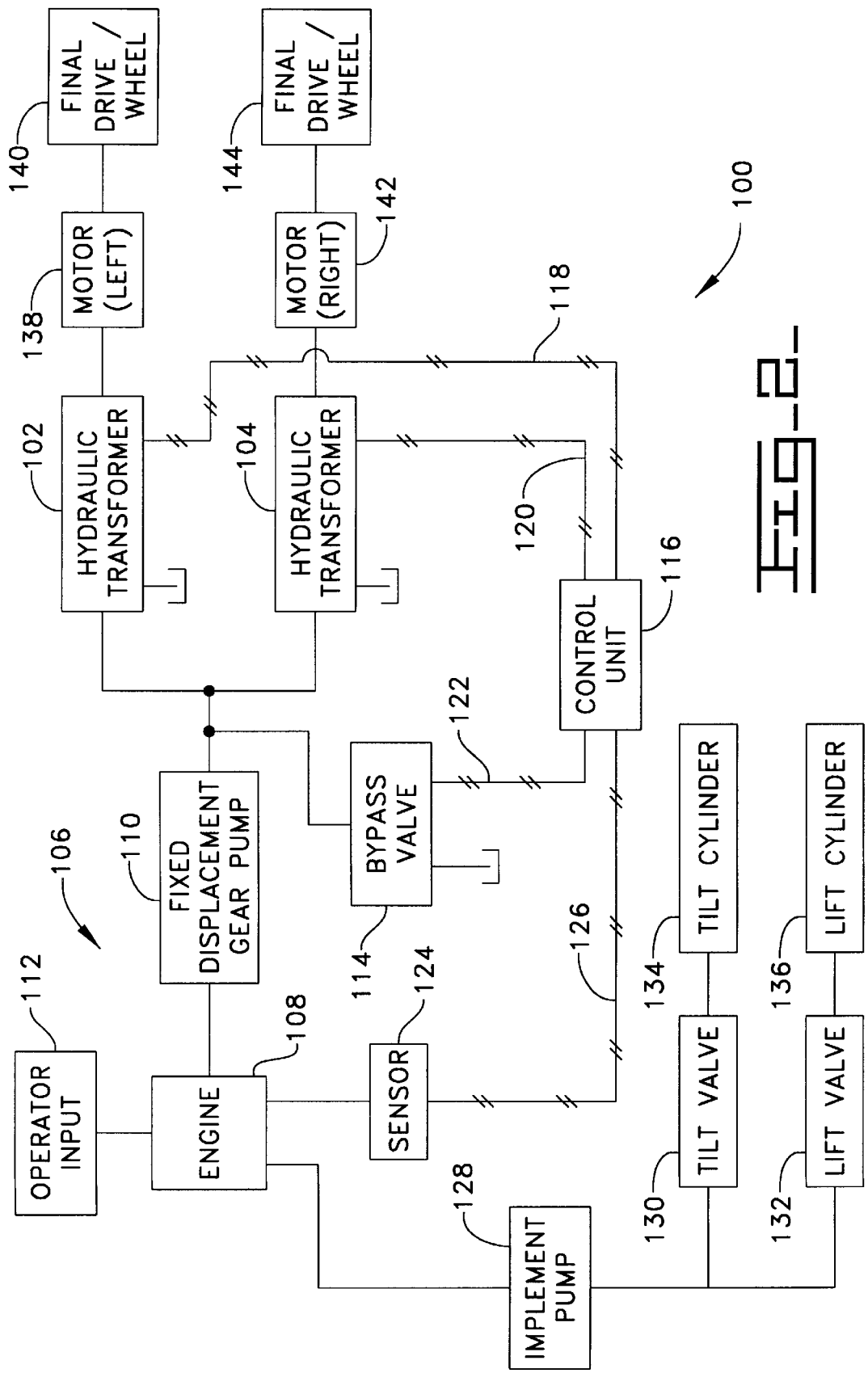

CONTROL SYSTEM FOR A HYDRAULIC TRANSFORMER HAVING VARIABLE PRESSURE INPUT

TECHNICAL FIELD

This invention relates generally to a control system for a hydraulic system having a hydraulic transformer, and more particularly, to a control system for a hydraulic system in which the hydraulic transformer has a variable pressure input.

BACKGROUND ART

Hydraulic transformers are useful devices in a hydraulic circuit or system. A hydraulic transformer provides pressure and flow energy transformations within the hydraulic circuit. Unlike valves, which only provide pressure reductions by throttling the flow through an orifice which incurs energy losses, the hydraulic transformer can provide an increase or decrease in pressure with corresponding increase or decrease in output flow. This is accomplished without incurring significant energy losses. Hydraulic transformers are typically used in conjunction with constant or known supply pressure as a source of power. The power source may be driven by any of a variety of prime movers such as a diesel engine, gasoline engine, piston or rotary engine, or an electric motor. The hydraulic transformers also need a hydraulic pumping device in conjunction with some type of pressure regulation system to provide the hydraulic transformers with a predetermined or constant supply pressure. This usually involves some other components such as hydraulic accumulators, pressure reducing valves, and variable displacement pumps with pressure compensation. In this manner, pump flow is adjusted to provide a constant known output pressure simultaneously with matching the output flow to the time varying demands of the hydraulic transformer connected to the hydraulic power source.

In order to provide a constant pressure to the input of the hydraulic transformer, a pumping device having some form of pressure regulation is required in combination with matching the output flow to the needs of the hydraulic system. This may require the use of pressure compensated variable displacement pumps, accumulators, pressure reducing valves or other types of pressure/flow compensation. The use of such devices are costly and create a complex system. The hydraulic system can be designed to be less complex and more economical if the supply to the hydraulic transformer can be a variable supply pressure and the flow requirements of the system are substantially matched to the flow from the hydraulic transformer. Additionally, if the speed of the machine is changed, as a result of a change in the throttle setting or as the load varies, the flow from the pump changes. By adjusting the hydraulic transformer, the flow from the transformer can be substantially matched to the flow from the pump. If the hydraulic transformer is supplied by a variable supply pressure the use of complex equipment such as hydraulic accumulators, pressure reducing valves, variable displacement pumps, and other devices necessary for maintaining a constant input pressure to the hydraulic transformer may be avoided. Simpler and lower cost power sources could then be used with a hydraulic transformer.

Accordingly, the present invention is directed to overcoming one or more of the problems as set forth above.

DISCLOSURE OF THE INVENTION

In one aspect of the present invention, a control system for a hydraulic transformer for providing hydraulic pressure to a fluid actuator has a hydraulic system for providing a variable pressure input to the hydraulic transformer, and a controller connected to the hydraulic transformer and the hydraulic system for matching the flow demand from the hydraulic transformer to the flow produced by the hydraulic system.

In another aspect of the present invention, a control system for a hydraulic transformer providing hydraulic pressure to a fluid actuator has a fixed displacement pump for providing a variable input pressure to the hydraulic transformer, a bypass valve connected between the fixed displacement pump and the hydraulic transformer, and a controller connected to the hydraulic transformer and the bypass valve for controlling when to actuate the bypass valve to allow a portion of the fluid to be directed from the fixed displacement pump to the bypass valve.

In yet another aspect of the present invention, a control system for a pair of hydraulic transformers, a first hydraulic transformer for providing hydraulic pressure to a first fluid actuator and a second hydraulic transformer for providing hydraulic pressure to a second fluid actuator, has a hydraulic system for providing a variable pressure input to each of the hydraulic transformers, and a controller connected to the hydraulic transformers and the hydraulic system for matching the flow demand from the hydraulic transformers to the flow produced by the hydraulic system.

BRIEF DESCRIPTION OF THE DRAWINGS

FIG. 2 is a detailed block diagram of the control system for a hydraulic transformer having a variable pressure input constructed according to the present invention.

BEST MODE FOR CARRYING OUT THE INVENTION

Figure 1:
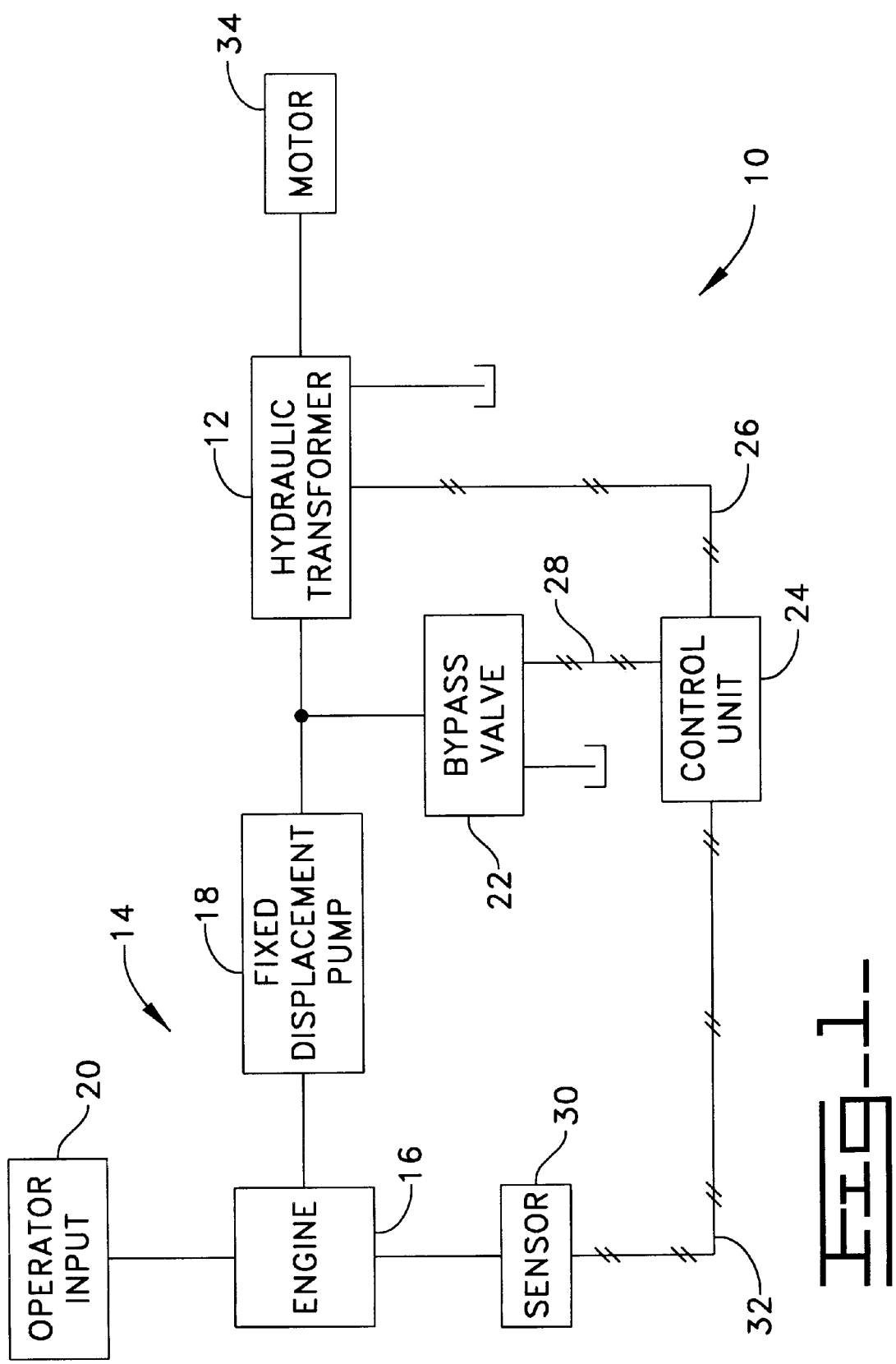
FIG. 1 is a block diagram of the control system for a hydraulic transformer having a variable pressure input constructed according to the present invention.

Referring now to the drawings, FIG. 1 illustrates a control system 10 for a hydraulic transformer 12 constructed according to the present invention. A hydraulic system 14 is connected to the hydraulic transformer 12 to provide a supply of pressure or hydraulic fluid to the hydraulic transformer 12. The hydraulic system 14 consists of an engine 16 which is coupled to a fixed displacement pump 18. The engine 16 may be controlled by an operator using an operator input 20 such as for example a throttle. The fixed displacement pump 18 serves as a variable supply of pressure or hydraulic fluid to the hydraulic transformer 12. A bypass valve 22, which for purposes of example only may be a bleed valve which may be operated mechanically or electronically, is connected between the fixed displacement pump 18 and the hydraulic transformer 12. The bypass valve 22 is provided for the removal of some portion or fraction of the hydraulic fluid from the hydraulic system 14 before the pressure or hydraulic fluid reaches the hydraulic transformer 12.

A control unit 24 is electrically connected to the hydraulic transformer 12 by an electrical lead 26 and to the bypass valve 22 by an electrical lead 28. The control unit 24 may include a microprocessor, a microcontroller, or any other suitable electronic circuit or integrated circuit. A sensor 30 which is used to sense the speed of the engine 16 or the position of the operator input 20 is also connected to the control unit 24 by a wire 32. The sensor 30 provides information or data to the control unit 24 corresponding to the speed of the engine 16 or the position of the operator input 20. The control unit 24 is used to match the flow demand from the hydraulic transformer 12 to the instantaneous flow produced by the hydraulic system 14. As the speed of the engine 16 changes in response to the operator input 20 the flow produced at the output of the pump 18 also changes directly in proportion to the speed of the engine 16. In order to control the power absorbed by the hydraulic transformer 12 the bypass valve 22 is operated to remove a portion or a fraction of the difference in flow between the hydraulic system 14 and the quantity of fluid removed by the hydraulic transformer 12. The hydraulic transformer 12 is used to provide hydraulic fluid to a motor 34.

In operation of the control system 10, an operator controls the operator input 20 by actuating the input 20 to any desired speed. The engine 16 then operates the fixed displacement pump 18 which provides a variable supply of hydraulic fluid to the hydraulic transformer 12. Once the hydraulic transformer 12 is provided with hydraulic fluid the hydraulic transformer 12 operates the motor 34. The control unit 24 at all times is monitoring the speed of the engine 16 or the position of the operator input 20 in order to determine whether the hydraulic transformer 12 needs to be adjusted to either increase or decrease the hydraulic fluid provided to the motor 34. As is known, hydraulic fluid from the hydraulic transformer 12 may be controlled by adjusting a port plate (not shown) within the hydraulic transformer 12. Movement of the port plate is effective to control the volume of fluid being delivered from the hydraulic transformer 12 to the motor 34.

Additionally, since the volume of fluid being delivered from the fixed displacement pump 18 is a known amount because it is based on the speed of the engine 16 and the volumetric displacement of the fixed displacement pump 18 per revolution and the volume of fluid being delivered by the hydraulic transformer 12 is controlled from a value of zero to a maximum capacity, the flow requirement of the motor 34 can be controlled by controlling the flow from the hydraulic transformer 12. The volume of fluid required by the motor 34 may be determined by the operator input 20. Further, the control unit 24 can control movement of the port plate within the hydraulic transformer 12 to adjust the flow accordingly. In order to control the pressure provided to the motor 34, the bypass valve 22 may be operated to bypass a small amount of fluid from the fixed displacement pump 18 to more closely control the pressure of the fluid being delivered to the motor 34. Additionally, the hydraulic transformer 12 may be operated in a flow absorption mode in order for the hydraulic transformer 12 to be controlled such that it removes a specified flow rate from the discharge or output cavity of the fixed displacement pump 18. The commanded value of this flow rate can be matched to the flow being produced by the pump operating at some known or measured speed at a given point in time. At any instant, the hydraulic transformer 12 is controlled such that the flow produced by the hydraulic system 14 is totally absorbed by the hydraulic transformer 12. This removes the burden of controlling the flow rate of the hydraulic system 14 itself in order to match the flow removal rate of the hydraulic transformer 12. Operation of the hydraulic transformer 12 in the flow absorption mode requires feedback knowledge of the hydraulic transformer's displacement ratio and the hydraulic transformer's rotating or angular speed.

Referring now to FIG. 2, a block diagram of a control system 100 for a pair of hydraulic transformers 102 and 104 having a variable pressure input is shown. The control system 100 includes a hydraulic system 106 which is connected to both of the hydraulic transformers 102 and 104.

The hydraulic system 106 consists of an engine 108 being coupled to a fixed displacement pump 110 such as a fixed displacement gear pump. The engine 108 may be controlled by an operator by use of an operator input 112 such as for example a throttle. A bypass valve 114, such as a bleed valve which may be operated mechanically or electronically, is connected between the fixed displacement pump 110 and the pair of hydraulic transformers 102 and 104. The bypass valve 114 is provided for the removal of some portion or fraction of the hydraulic fluid from the hydraulic system 106 and the hydraulic transformers 102 and 104.

A control system or unit 116 is electrically connected to the hydraulic transformers 102 by an electrical lead 118 and to the hydraulic transformer 104 by an electrical lead 120. The control system 116 is also capable of controlling the operation of the bypass valve 114 by being connected to the bypass valve 114 via an electrical lead 122. The control system 116 may include or comprise a microprocessor, a microcontroller, or any other suitable electronic circuit. A sensor 124 which is used to sense the speed of the engine 108 is also connected to the control system 116 by a wire 126. The sensor 124 provides information or data to the control system 116 corresponding to the speed of the engine 108. The control system 116 is used to match the flow demand from the hydraulic transformers 102 and 104 to the instantaneous flow produced by the hydraulic system 106. As the speed of the engine 108 changes in response to the operator input 112 the flow produced at the output of the pump 110 also changes directly in proportion to the speed of the engine 108.

The engine 108 is also capable of operating an implement pump 128 which in turn operates a tilt valve 130 and a lift valve 132. The tilt valve 130 is coupled to a tilt cylinder 134. Additionally, the lift valve 132 is connected to a lift cylinder 136. Actuation of the valves 130 and 132 will operate the cylinders 134 and 136, respectively.

The hydraulic transformer 102 is connected to a fluid actuator or load circuit such as a motor 138 which has been designated as a left motor. The motor 138 is connected to a final drive wheel 140 and operation of the motor 138 will turn the final drive wheel 140. Additionally, the hydraulic transformer 104 is connected to the motor 142 which in turn is connected to a final wheel drive 144.

Since the total power absorbed by both of the hydraulic transformers 102 and 104 is to be allocated to each load circuit or motor 138 and 142 according to its instantaneous requirements, the control unit 116 must ensure that the power absorbed by each hydraulic transformer 102 and 104 is consistent with its individual motor 138 and 142. This in turn requires that the percentage of total flow absorbed by each hydraulic transformer 102 and 104 is proportional to its power requirements. Consequently, at any instant, the control unit 116 must ensure that the total flow rate absorbed by the hydraulic transformers 102 and 104 is equal to the flow rate of the hydraulic system 106 and the individual flow absorption rates of the hydraulic transformers 102 and 104 are in proportion to their respective power demands.

Industrial Applicability

The control system constructed in accordance with the teachings of the present invention advantageously controls a hydraulic transformer having a variable pressure input. The control system controls the operation of the hydraulic transformer by adjusting the flow from the hydraulic transformer to substantially match the flow from a fixed displacement pump within a hydraulic system. The control system of the present invention is also capable of controlling two or more hydraulic transformers which each have a variable pressure input.

Other aspects, objects and advantages of the present invention can be obtained from a study of the drawings, the disclosure and the appended claims.

What is claimed is:

1. A control system for a hydraulic transformer providing hydraulic pressure to a fluid actuator comprising a hydraulic system for providing a variable pressure input to the hydraulic transformer, the hydraulic system including an engine having an operator input and the engine being connected to a fixed displacement pump with the pump providing a source of variable pressure to the hydraulic transformer, and a controller connected to the hydraulic transformer and the hydraulic system for matching the flow demand from the hydraulic transformer to the flow produced by the hydraulic system.

2. The control system of claim 1 further comprising a bypass valve connected between the hydraulic system and the hydraulic transformer, the controller being connected to the bypass valve, the controller for operating the bypass valve to remove a portion of hydraulic fluid from the hydraulic system.

3. The control system of claim 1 further including a sensor coupled to the engine for sensing the speed of the engine, the sensor being connected to the controller for providing the controller with the speed of the engine.

4. The control system of claim 3 wherein the controller is capable of controlling the operation of the hydraulic transformer based upon the speed of the engine.

5. A control system for a pair of hydraulic transformers, a first hydraulic transformer for providing hydraulic pressure to a first fluid actuator and a second hydraulic transformer for providing hydraulic pressure to a second fluid actuator comprising:

a hydraulic system for providing a variable pressure input to each of the hydraulic transformers;

a controller connected to the hydraulic transformers and the hydraulic system for matching the flow demand from the hydraulic transformers to the flow produced by the hydraulic system; and a sensor coupled to the hydraulic system for sensing the speed of the hydraulic system, the sensor being connected to the controller for providing the controller with the speed of the hydraulic system.

6. The control system of claim 5 wherein the controller is capable of controlling the operation of the hydraulic transformers based upon the speed of the hydraulic system.

7. A control system for a hydraulic transformer providing hydraulic pressure to a fluid actuator comprising:

a hydraulic system for providing a variable pressure input to the hydraulic transformer, a controller connected to the hydraulic transformer and the hydraulic system for matching the flow demand from the hydraulic transformer to the flow produced by the hydraulic system, and a sensor coupled to the hydraulic system for sensing the speed of the hydraulic system, the sensor being connected to the controller for providing the controller with the speed of the hydraulic system.

8. The control system of claim 7 wherein the controller is capable of controlling the operation of the hydraulic transformer based upon the speed of the hydraulic system.

9. A control system for a hydraulic transformer comprising:

a hydraulic transformer for providing hydraulic pressure to a fluid actuator, a fixed displacement pump for providing a variable input pressure to the hydraulic transformer, a bypass valve connected between the fixed displacement pump and the hydraulic transformer, a controller connected to the hydraulic transformer and the bypass valve for controlling when to actuate the bypass valve to allow a portion of the fluid to be directed from the fixed displacement pump to the bypass valve, and an engine having an operator input, the engine being connected to the fixed displacement pump.

10. The control system of claim 9 further including a sensor coupled to the engine for sensing the speed of the engine, the sensor being connected to the controller for providing the controller with the speed of the engine.

11. The control system of claim 10 wherein the controller is capable of controlling the operation of the hydraulic transformer based upon the speed of the engine.

12. A control system for a pair of hydraulic transformers, a first hydraulic transformer for providing hydraulic pressure to a first fluid actuator and a second hydraulic transformer for providing hydraulic pressure to a second fluid actuator comprising: a hydraulic system for providing a variable pressure input to each of the hydraulic transformers, the hydraulic system including an engine having an operator input and the engine being connected to a fixed displacement pump with the pump providing a source of variable pressure to the hydraulic transformers; and a controller connected to the hydraulic transformers and the hydraulic system for matching the flow demand from the hydraulic transformers to the flow produced by the hydraulic system.

13. The control system of claim 12 further comprising a bypass valve connected between the hydraulic system and the hydraulic transformers, the controller being connected to the bypass valve, the controller for operating the bypass valve to remove a portion of hydraulic fluid from the hydraulic system.

14. The control system of claim 12 wherein the second fluid actuator is a motor.

15. The control system of claim 12 further comprising a sensor coupled to the engine for sensing the speed of the engine, the sensor being connected to the controller for providing the controller with the speed of the engine.

16. The control system of claim 15 wherein the controller is capable of controlling the operation of the hydraulic transformers based upon the speed of the engine.

17. The control system of claim 12 wherein the first fluid actuator is a motor.

* * * * *